United States Patent [19]
Wright

[11] Patent Number: 4,474,259
[45] Date of Patent: Oct. 2, 1984

[54] INTERNALLY VENTILATED NOISE SUPPRESSOR FOR JET ENGINE

[75] Inventor: Charles P. Wright, Seattle, Wash.

[73] Assignee: The Boeing Company, Seattle, Wash.

[21] Appl. No.: 372,248

[22] Filed: Apr. 26, 1982

[51] Int. Cl.³ .......................... F01N 1/14; F02K 1/46
[52] U.S. Cl. .................................. 181/220; 181/213; 60/262
[58] Field of Search ............... 181/215, 219, 220, 221, 181/175, 213; 60/262, 317, 324, 272

[56] References Cited

U.S. PATENT DOCUMENTS

| | | | |
|---|---|---|---|
| 2,793,493 | 5/1957 | Kadosch et al. | 60/35.54 |
| 2,799,990 | 7/1957 | Hausmann | 60/35.54 |
| 2,812,636 | 11/1957 | Kadosch et al. | 60/35.55 |
| 2,944,624 | 7/1960 | Morley | 181/220 |
| 3,039,560 | 6/1962 | Duthion et al. | 181/220 |
| 3,084,507 | 4/1963 | Kleinhans et al. | 60/35.54 |
| 3,092,205 | 6/1963 | Brown et al. | 181/213 |
| 3,174,282 | 3/1965 | Harrison | 60/35.6 |
| 3,572,463 | 3/1971 | Eschenburg | 181/215 |
| 3,612,212 | 10/1971 | Macdonald | 181/175 |
| 3,613,826 | 10/1971 | Cabassut | 181/219 |
| 3,618,701 | 11/1971 | Macdonald | 181/221 |
| 3,650,348 | 3/1972 | Colebrook | 181/215 |
| 3,905,445 | 9/1975 | Scharton | 181/213 |
| 3,910,375 | 10/1975 | Hache et al. | 181/215 |
| 4,052,847 | 10/1977 | Rodgers et al. | 60/262 |
| 4,168,763 | 9/1979 | White et al. | 181/222 X |

FOREIGN PATENT DOCUMENTS 165369 9/1955 Australia .
894299 4/1962 United Kingdom .

Primary Examiner—Benjamin R. Fuller
Attorney, Agent, or Firm—Delbert J. Barnard; Eugene O. Heberer

[57] ABSTRACT

A noise suppressor (24, 76) for a jet engine nozzle (12, 64) is constructed so that the noise suppressor internally ventilates the nozzle jet efflux with ambient air by tubes (26, 78) having ambient inlets (30, 90) upstream of the nozzle discharge end (38, 72). The noise suppressor tubes may be relatively short with respect to the nozzle length but extend downstream of the nozzle so that the gas exhaust jet pumps or aspirates ambient air through the internally ventilating tubes so as to properly mix the air with the gas exhaust to suppress the noise from the jet engine exhaust. The internally ventilating ducts of the noise suppressor extend downstream of the nozzle (38, 40, 72, 84) at least to just beyond a region of high static pressure in the jet and extend in the jet to where a substantial ejected airflow pressure and volume are maintained in the ducts. Where the internally ventilating ducts are arranged concentrically about the axis of the discharged jet, noise is suppressed radially around the nozzle. In other embodiments where the ducts are eccentrically positioned, noise is reduced in a favored or selected direction so as to reduce the total ventilation necessary in comparison with concentric ventilation. In situations where internal ventilation ducts extend into multi-element nozzle tubes or lobes, for example, the internally ventilating ducts may be asymmetrically positioned so as to reduce noise in only a particular direction, such as toward the community below or as to one side of the engine in question.

15 Claims, 19 Drawing Figures

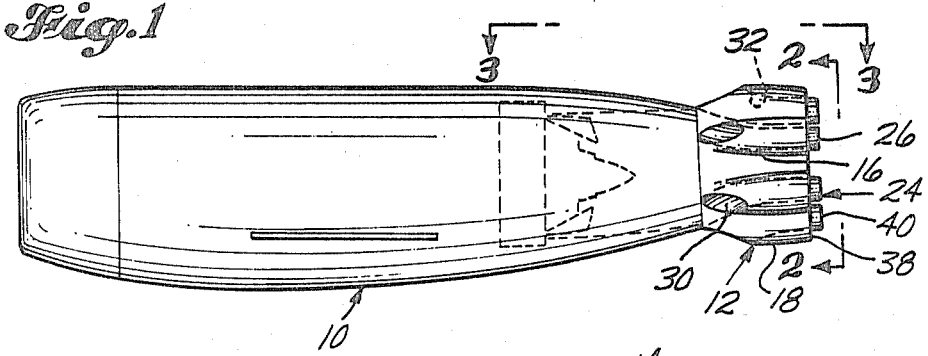
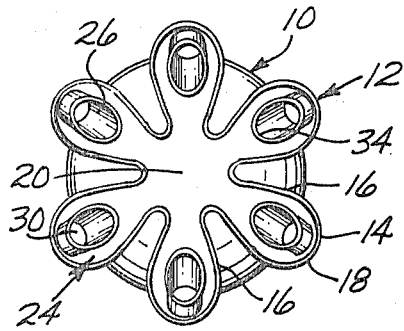
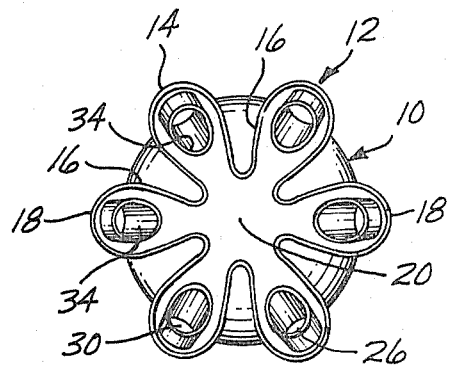
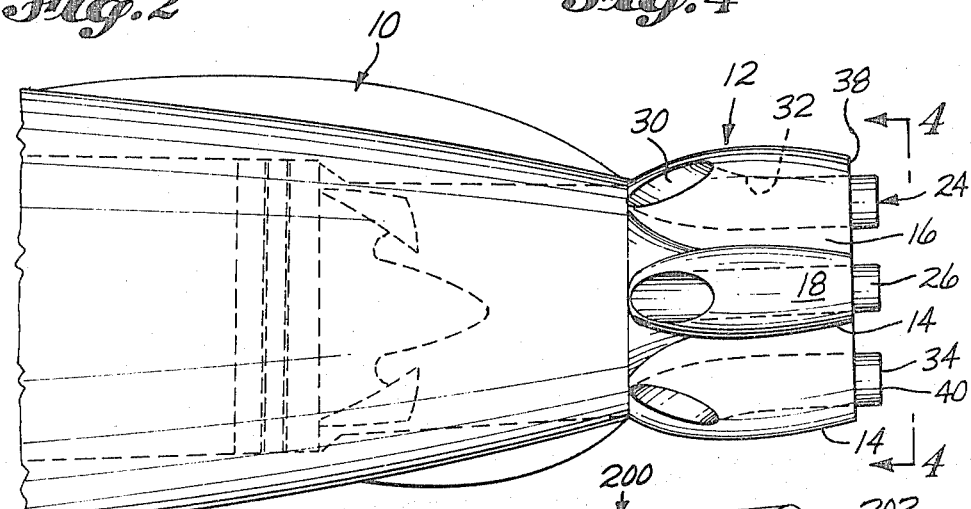
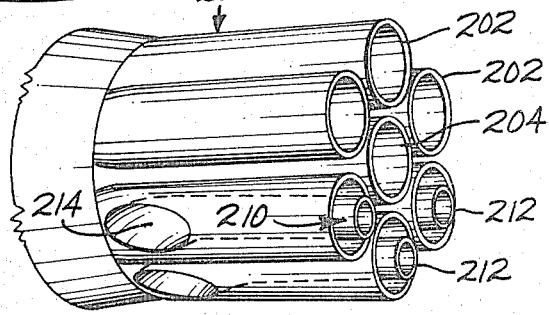

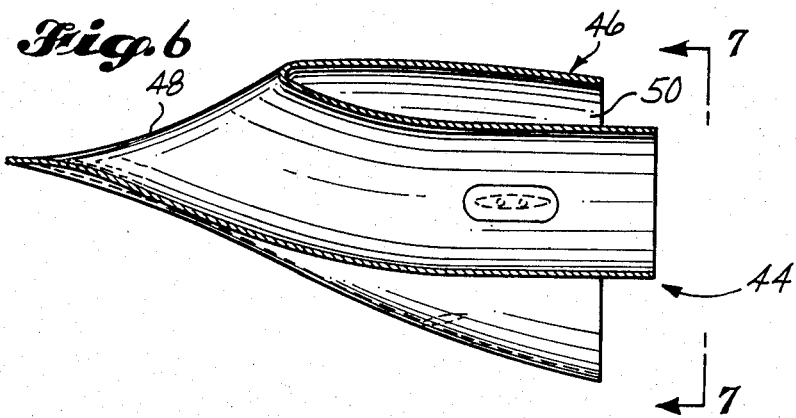
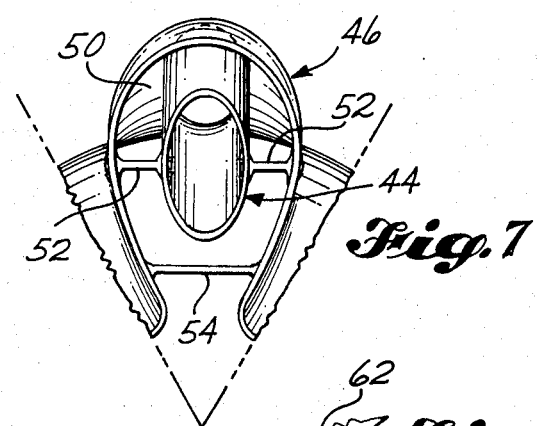
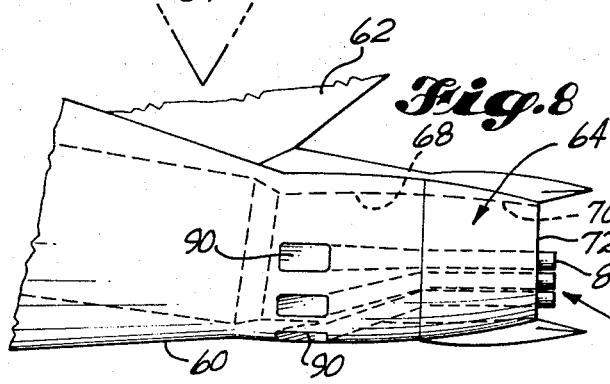
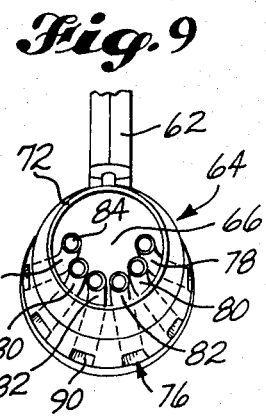
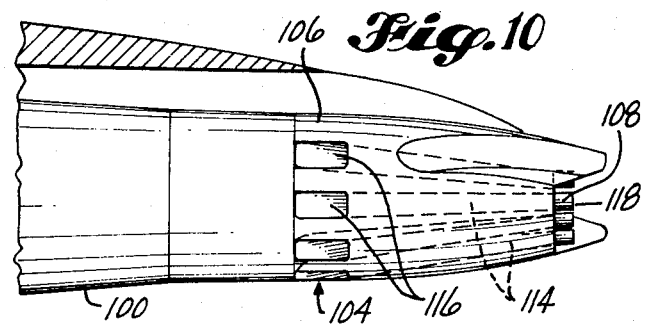
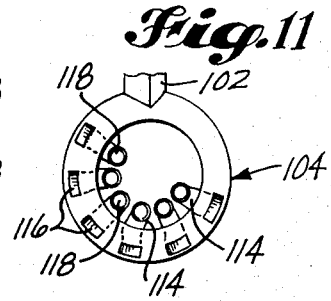

INTERNALLY VENTILATED NOISE SUPPRESSOR FOR JET ENGINE

TECHNICAL FIELD

The invention relates to noise suppressors for jet engines and particularly, for jet engines for subsonic aircraft in which the nozzle has a generally open central portion.

BACKGROUND ART

Multi-element jet engine noise suppressor nozzle systems have presented considerable design problems in the past. They have been difficult to fabricate and their overall girth, length, and base area have in some cases restricted takeoff roll attitudes and have produced aerodynamic drag penalties. Further, multi-element jet noise suppressors have tended to be ineffective at lower jet velocities common with the lower power settings for turbojet engines as well as the entire range of power settings for high bypass ratio engines.

In the prior art, internal ventilation for jet noise control has been attempted. A search of the patent literature illustrates a number of systems in which the ambient air has been introduced into a jet engine nozzle for the purpose of noise suppression. U.S. Pat. No. 3,910,375 illustrates a jet engine silencer in which ambient air is permitted to flow from the exterior of the nozzle into a central body. The entry direction is such to cause substantial loss in the volume of airflow due to friction and flow turbulence. The air is caused to mix with the exhaust gases externally of the nozzle. This arrangement provides for only a small internal ventilation area, and a relatively complicated actuation system is required to operate the flaps in the central body externally of the nozzle to permit airflow therethrough.

U.S. Pat. No. 3,039,560 discloses a silencer in which inlets of air ducts are spaced around the periphery of the nozzle. The air ducts extend radially inwardly so that the gas flows therearound and out of the nozzle. Outlets of the air ducts are in the same plane as the outlet of the nozzle from which the exhaust gases flow.

U.S. Pat. No. 3,613,826 illustrates a jet engine silencer having ambient air intake vents spaced around the nozzle periphery. Orientatable tubular elements extend from the vents into the nozzle and are terminated substantially inwardly of the nozzle discharge end.

In U.S. Pat. No. 3,650,348 jet exhaust gas exits through round tubes, and ambient air enters the nozzle through peripheral openings and passes around the gas exhaust tubes, the gas and air being mixed at the downstream end of the nozzle.

In U.S. Pat. No. 2,944,624 jet engine gas is exhausted through elliptical tubes having tapered troughs open on one side to permit the entry of the ambient air into the individual nozzle members, the air and gas exhaust being mixed immediately externally of the end of the nozzle members.

The following additional patents, found in the search, disclose noise suppressors and jet deflecting devices for use with jet engines:

U.S. Pat. No. 2,793,493
U.S. Pat. No. 2,799,990
U.S. Pat. No. 2,812,636
U.S. Pat. No. 3,084,507
U.S. Pat. No. 3,174,282
U.S. Pat. No. 3,572,463
U.S. Pat. No. 3,618,701
U.S. Pat. No. 4,052,847
Australian No. 165,369
Great Britain No. 894,299

DISCLOSURE OF THE INVENTION

The invention is a jet engine noise suppressor, particularly adapted for use in nozzles having a generally open central portion. The invention reduces radiation of jet noise in the direction of a far-field observer by introducing ventilation flow inside of a jet efflux, either concentric with the flow or eccentric to the flow.

The noise suppressor, according to the invention, supplies ambient air through the inside of the nozzle with duct means for carrying the air through the wall of the nozzle, through the nozzle, and into the gas jet exhausting from the nozzle. The duct means have upstream and downstream open ends and are open upstream to receive the ambient air and are connected into the wall of the nozzle for carrying the air substantially in the axial direction through the nozzle and downstream thereof out of an open end of the duct means into the gas jet. The duct means extend downstream of the nozzle at least to just beyond a region of high static pressure in the jet and extend into the jet exhaust to where a substantial ejecting airflow pressure and volume are maintained in the duct means. The duct means are closed to the nozzle upstream of the downstream end of the nozzle.

The ducts which provide the internal ventilation for noise suppression may be arranged concentrically about the jet axis, and hollow struts are used to join the ducts to the atmosphere. The concentric ducts may be in the form of a single centrally positioned tube, a concentric annulus about the jet axis, or a series of annularly spaced tubes, radially outwardly of the jet axis, for example.

Ducts for eccentric internal ventilation may be in the form of a semicircular tube in cross section, a semicircular annulus portion, and asymmetrically positioned tubes adjacent a peripheral portion of the nozzle. Such arrangements of eccentric ventilation reduce noise in a selected direction, also reducing the amount of total ventilation necessary in comparison with concentric ventilation which reduces noise in all radial directions.

Multi-tube or multi-lobe nozzle individual ventilating ducts may be positioned in all of the tubes or lobes or may be positioned selectively in the tubes and lobes so as to provide internal ventilation asymmetrically to reduce noise in a particular direction, for example, toward the underside of an airplane.

Noise reduction with the foregoing types of internal ventilation, according to the invention, has been found to be at least 7.5 EPNdB at typical low bypass ratio turbojet engine conditions.

The present invention provides good jet noise suppression characteristics at all jet velocities. The prior art jet noise suppressors, that is, multi-tube and multi-lobe nozzles without internal ventilation are not effective at low jet velocities common to high bypass ratio jet engines.

The present invention provides good noise suppression with a minimal increase in the overall nozzle area in comparison to that nozzle area without a suppressor. For example, defining the area ratio, as $AR = A_{total}/A_{jet}$, an internally ventilated round convergent nozzle with an area ratio of 1.23 provided the same jet noise suppression as a multi-tube nozzle with an area ratio of 1.85. With the use of the present invention, the small area ratio made possible reduced nozzle-exit girth which provides the advantage of less likely interference with airplane rotation during takeoff or flap settings.

With the use of the present invention to provide jet noise suppression, a round nozzle exit can be retained in contrast to use of some of the prior art noise suppressors. A round nozzle exit and round engine nacelle are necessary to accommodate a target type or "clam shell" type thrust reverser, such as is used on the Boeing 737 airplane.

Further, with the elimination of a central ventilated large plug, the nozzle can be made shorter and the ventilation ducts can also be made very short and their inlets can be positioned close to the downstream end of the nozzle.

The introduction of high ambient weight flows for internal ventilation, according to the invention, occurs without any base drag penalties. The engine output is not unduly blocked by the ventilation flow ducts and the inventive system does not interfere with the nozzle area control systems or thrust reverser mechanisms.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 1 is a side elevational view of a jet engine having a six lobe internally ventilated nozzle according to the invention;

FIG. 2 is an end view of the nozzle, taken along the lines 2—2 in FIG. 1;

FIG. 3 is a plan view of the nozzle, taken along the lines 3—3 in FIG. 1;

FIG. 4 is an end view of the nozzle taken along the lines 4—4 in FIG. 3;

FIG. 5 is a pictorial view of a seven tube nozzle, having a three tube asymmetric noise suppressor;

FIG. 6 is a fragmentary cross-sectional view of an internally ventilation tube of a 6-lobe nozzle noise suppressor according to the invention;

FIG. 7 is an end view of the internal ventilation tube and nozzle portion taken along the lines 7—7 in FIG. 6;

FIG. 8 is a side elevational view of a portion of a jet engine and a round nozzle having an eccentric noise suppressor according to the invention;

FIG. 9 is an end view of the noise suppressor and nozzle shown in FIG. 8;

FIG. 10 is a side elevational view of a jet engine nozzle having a six tube eccentric flush inlet noise suppressor, the tubes being to one side of the nozzle;

FIG. 11 is an end view of the nozzle shown in FIG. 10;

BEST MODE FOR CARRYING OUT THE INVENTION

Figure 12:
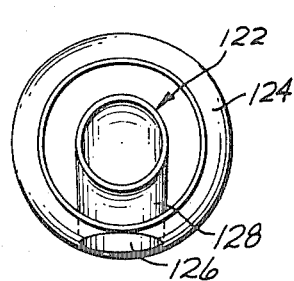
FIG. 12 is an end view of a nozzle having a single tube concentrically positioned noise suppressor.

Referring again to the drawings, there is shown in FIGS. 1-4 the outline of a jet engine 10 having a six lobe gas exhaust nozzle 12. Individual lobes 14 are annularly spaced around the nozzle, having generally radially directed wall means 16 and annularly or circumferentially directed outer wall means 18, the wall means extending longitudinally so as to bound a substantially open hollow central portion 20, coaxial with the nozzle.

An internally ventilating jet engine noise suppressor, generally designated as 24, is formed within the lobes 12 by individual annularly spaced, internally ventilating ducts 26, having upstream ends 30 to receive the ambient air. The inlets 30 are elliptical and the ducts 26 have a passage 32 extending downstream therefrom and terminating in elliptical discharge opening 34, having its long diameter extending generally radially.

The lobes 12 and wall means 16 and 18 terminate downstream in a plane 38. The passage 32 in the ducts extends from the inlet 30 to the outlet 34 so that air flowing therethrough is substantially in the axial direction of the nozzle 12. The ducts 26 terminate in a plane 40 downstream of the nozzle end plane 38 so that the ducts extend downstream of the nozzle at least just beyond a region of high static pressure in the jet exhausted from the nozzle and extend in the jet exhaust to where a substantial ejected airflow pressure and volume are maintained in the ducts to internally ventilate the jet.

Thus, the ducts have the proper length relative to the nozzle end so that the jet exhaust which flows in the lobes around the ducts and through the central portion 20 creates a good pumping or aspirating action in the ducts to obtain a proper mixture of air with the gas exhaust to provide a substantial noise suppression of the gas exhaust radially outwardly of the nozzle, the lobes and ducts being concentric with respect to the nozzle and central portion 20. The inner ends of the ducts around the inlets 30 are secured within the nozzle and there is no flow from the ducts into the nozzle until the jet aspirates or induces the ambient air by ejector action from the ducts downstream from the nozzle.

In FIGS. 6 and 7, there is illustrated the means for securing an internally ventilating duct 44, similar to the ducts 26, within a lobe 46, similar to the lobes 12. The ducts and lobes have the same general shape as those previously described. An inner end or inlet 48 of the duct is formed within an upstream portion of the nozzle lobe and extends downstream therefrom, within the lobe, to permit ambient airflow in the axial direction through the duct into the gas being discharged from a downstream end 50 of the lobe. The duct is secured to the lobe adjacent their respective downstream ends by transversely directed struts 52 and the lobe configuration is supported by a strut 54 adjacent the radial inner end of the lobe.

In FIGS. 8 and 9, a jet engine 60, attached to an aircraft at 62, is shown fragmentarily and has a generally annular convergent nozzle 64. The nozzle 64 has a substantially hollow central portion 66, surrounded by upstream substantially cylindrical wall means 68 and slightly conical downstream wall means 70 terminating in an annular end 72.

In this embodiment of the invention, a noise suppressor, generally designated at 76, is positioned at the lower peripheral portion of the nozzle so as to be eccentric with respect to the annular end 72 and the open central portion 66. The suppressor 76 is comprised of three pairs of internally ventilating tubes 78, 80 and 82, one of each pair being on each side of a vertical central line through the nozzle. Each tube has a generally cylindrical downstream discharge opening 84 extending beyond the plane of the nozzle end 72 so as to terminate just beyond the region of high static pressure in the exhaust gas jet from the engine and to extend in the jet exhaust to be in a position where a substantial internally ventilated, ejected airflow pressure and volume are maintained within the duct means adjacent their ends.

Each of the ducts has a flush rectangular inlet opening 90 adjacent the upstream end of the nozzle to receive ambient air which is aspirated or pumped internally through the nozzle so as to ventilate the jet exhaust downstream of the nozzle. The tubes 78, 80, and 82 are fixed in place and shaped so as to permit the air being ejected therethrough to move in a substantially axial direction through the nozzle and into the jet downstream of the nozzle. The concept of an eccentrically positioned noise suppressor is adaptable for reducing noise in a selected favored direction so as to permit the reduction of the total amount of ventilation necessary for jet exhaust in comparison to concentric ventilation which reduces noise in all radial directions.

In FIGS. 10 and 11 there is shown a jet engine 100 securable to an aircraft at 102 and having a nozzle 104 generally concentric with the engine. Here the nozzle 104 is substantially cylindrical at its upstream end 106 and converges downstream into a centrally positioned annular discharge opening 108 having a generally hollow central portion 110.

A noise suppressor comprised of six internally ventilating tubes 114 is asymmetrically and eccentrically positioned with respect to the nozzle and engine. At the upstream end there are flush substantially rectangular ambient air entry openings 116 and extending therefrom are generally cylindrical tubular portions which terminate in cylindrical discharge ends 118 at a predetermined location extending beyond the plane of the nozzle end to provide the maximum benefits relative to the ejection of air through the internally ventilating noise suppressor tubes by the action of the jet exhausting through the nozzle, as described above. As indicated with respect to the noise suppressor shown in FIG. 9, the asymmetric internal ventilation noise suppressor comprised of the tubes 114 is created to reduce noise in a particular direction.

Figure 13:
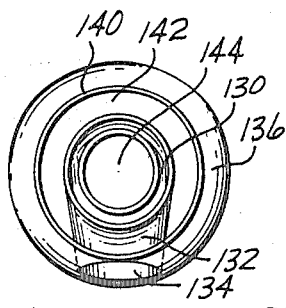
FIG. 13 is an end view of a nozzle having a ventilating concentric annulus-type noise suppressor.
Figure 14:
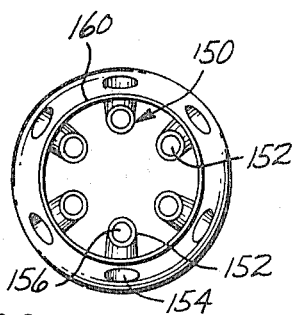
FIG. 14 is an end view of a nozzle having an annularly spaced concentric six tube suppressor.

In FIGS. 12-14 there are three examples of concentric, internally ventilated flow to the exhaust of the jet discharge from a jet engine through its nozzle. All of the noise suppressing devices shown in FIGS. 12-19 extend downstream beyond the end of the nozzle into a region just beyond the high static pressure in the jet where substantial ejected airflow pressure and volume are maintained in the noise suppressor ducting. Extension of these noise suppressors beyond the nozzle are not shown, except in FIG. 5 which illustrates a side view of the tube-form nozzle shown in FIG. 18.

A noise suppressor 122, FIG. 12, extends internally in a generally annular converging nozzle 124, the noise suppressor being comprised of one tube having its inlet opening 126 upstream of the nozzle discharge. Extending from the opening through the nozzle is a single relatively large cylindrical tubular member 128 which forms a substantially open hollow central portion coaxial with the nozzle at the downstream ends. The nozzle 124 has a wall means longitudinally bounding the internally ventilating tube 128 which is centrally positioned at its downstream end to provide a central portion coaxial with the nozzle. Typically, hollow struts, not shown, join the central downstream tubular member to the nozzle and provide a portion of the internal ventilation structure which is connected to the ambient air inlet or inlets.

In FIG. 13 a similar coaxially positioned internally ventilating noise suppressor is illustrated. Here the noise suppressor on the downstream end is in the form of an annulus 130 formed of two concentric tubes and connected to the atmosphere by strut-tube members 132, joining the inlet opening 134. The noise suppressor is thus comprised of the elements 130, 132 and 134, and annulus 130 being centrally positioned within nozzle 136. The nozzle 136 has an annular opening internally of its downstream annular end 140 so that the gas exhaust is exited through a gas annulus 142 outwardly of the centrally positioned ventilating annulus 130, and in addition has a gas exhaust 144, centrally positioned radially inwardly of the annulus 130, through which both gas exhaust jets eject ambient air to suppress the noise level of the jet engine exhaust on which the nozzle 136 is fitted.

In FIG. 14 a concentrically positioned noise suppressor 150 is comprised of six annularly spaced internally ventilating ambient air tubes 152. The tubes 152 have ambient air inlets 154 and discharge outlets 156. The air inlets 154 are positioned adjacent the nozzle outlet opening 160, and thus, the tubes are relatively short in that it is not necessary that they extend a substantial distance into the nozzle in order to provide an internally ventilating noise suppressor. Here again, the tubes terminate downstream of the nozzle opening, as described above in a predetermined favorable location to achieve the proper aspiration of the ambient air through the noise suppressor by the jet so as to ventilate the jet exhaust gases substantially to reduce the jet engine noise level.

Figure 15:
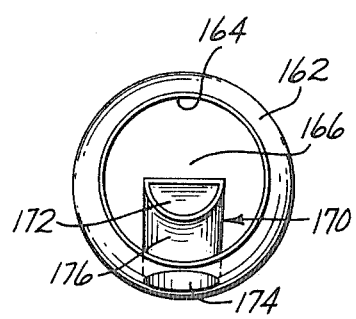
FIG. 15 is an end view of a nozzle having an eccentric one tube semicircular noise suppressor.
Figure 16:
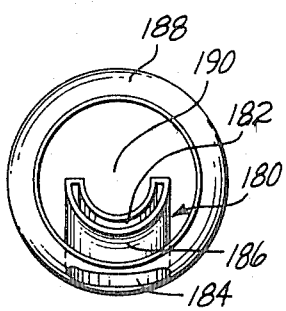
FIG. 16 is an end view of a nozzle having an eccentric semicircular annulus-shaped single tube noise suppressor.
Figure 17:
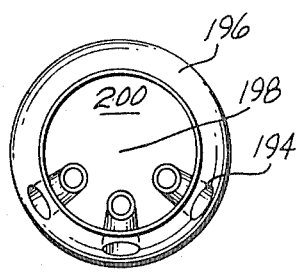
FIG. 17 is an end view of a nozzle having an asymmetric three tube noise suppressor.

In FIGS. 15-17 the internally ventilating noise suppressors are eccentrically positioned relative to the nozzle exhaust opening. In FIG. 15 a converging nozzle 162 having an outlet opening 164 has wall means longitudinally bounding a substantially hollow portion 16 through which an eccentrically structured and positioned noise suppressor 170 provides a hollow opening 172 in the form of a semicircular discharge ambient air outlet. The internally ventilating single tube noise suppressor 170 has an ambient air inlet 174 upstream of the nozzle discharge opening and the air is carried through the inlet 174 into a tubular portion 176 of the suppressor and is aspirated out of the semicircular tubular opening 172 by the exhausting gas jet so as to suppress the engine noise exhaust eccentrically with respect to the annular nozzle; that is, toward the lower portion of the nozzle.

In FIG. 16 an eccentrically positioned noise suppressor 180 is formed to have a semicircular annulus 182 connected to ambient air inlet 184 by an internally ventilating tubular portion 186. Here the nozzle 188 has a hollow central portion formed in part by the semicircular configuration along the upper side of the partial annulus 182.

In FIG. 17 an internally ventilating noise suppressor is comprised of three tubes 194 eccentrically positioned in a lower end of an annular nozzle 196 so as to provide a source of ambient air to be internally mixed with the jet exhaust of the engine to which the nozzle is connected. The jet exhaust is discharged through the central portion 198 and the portion 200 above the central portion is not ventilated so that the noise suppression is effective at the lower portion of the nozzle in contrast to the concentric arrangement shown in FIG. 14.

Figure 18:
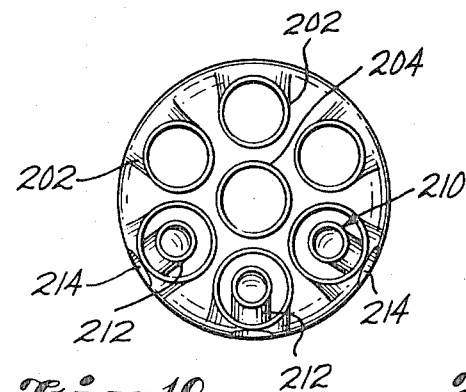
FIG. 18 is an end view of the seven tube jet nozzle shown in FIG. 5 and having a three ventilated-tube asymmetric noise suppressor.

In FIGS. 5 and 18 a multi-element nozzle 200 is comprised of six annularly spaced, generally cylindrical tubes 202 and a central tube 204. The nozzle 200 is secured downstream of a jet engine to receive its exhaust gases which are adapted to be discharged through the individual tubes 202 and 204. An asymmetric noise suppressor 210 is comprised of three internally ventilating tubes 212 at the lower end of the nozzle and has three ambient air inlets 214, each extending through a tube 202. The remainder of the tubes 212 extends in tubes 202 so as to be coaxial therewith and so as to internally ventilate the gases discharged through the three lower tubes 202, the tubes 212 extending downstream of the tubes 202 as described above. As indicated, the noise suppressor 210 is designed to reduce noise in a particular direction, namely, downwardly with respect to the nozzle 200.

Tests have been made with a model seven tube nozzle, similar to that shown in FIGS. 5 and 18. Without the present invention, the nozzle had 6.2 PNLWdB jet noise suppression at a jet velocity of 1800 FPS; with the same nozzle and same conditions and the seven tubes being ventilated with the present invention, the noise suppression was 9.3 PNLWdB. PNLWdB is a duration weighted PNL value determined by summing PNL from 90 to 160 in 10-degree increments at observer positions on the sideline parallel to the jet axis; that is, $$PNLWdB = 10 \log_{10} \sum_{90°}^{100°} \left[ \frac{10^{\frac{PNL}{10}}}{SiN^2 \theta} \right]$$

With the nozzle in FIG. 5 rotated to have four lower annular tubes and only those four ventilated, the same noise suppression characteristics occurred in the vertically downwardly direction; that is, the direction between each pair of two tubes of the lower four.

Figure 19:
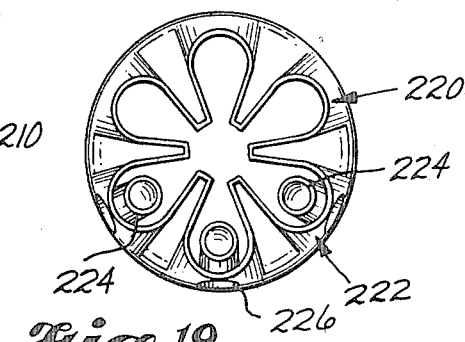
FIG. 19 is an end view of a six lobe nozzle having a three ventilated-tube asymmetric noise suppressor.

In FIG. 19 a six lobe exhaust nozzle 220 has an asymmetric multi-element internally ventilating noise suppressor 222 formed of three tubes 224 positioned in three of the lower lobes of the nozzle. Each of the tubes is connected to the ambient air by an inlet 226. The tubes extend through the lobe walls and axially outwardly through the lobes to a predetermined desired distance downstream of the lobe ends. In this arrangement, the tubes 224 internally ventilate three lower lobes of the nozzle and provide an asymmetric internal ventilation suppressor which is designed to suppress exhaust noise on the downward side of the nozzle, as indicated in FIG. 19. The gas exhaust flows outwardly through the nozzle, through each of the lobes and around the suppressor tubes in three of the lower lobes by which the air ejected through the suppressor tubes by the pumping action of the jet exhaust is mixed therewith so as to reduce the noise on the underside of the nozzle.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

I claim:

1. In a jet engine nozzle adapted to exhaust a propulsive gas jet,
   said nozzle having wall means longitudinally bounding a hollow central portion substantially coaxial with said nozzle,
   jet engine noise suppressor means for supplying ambient air through the inside of said nozzle so as to reduce the noise produced by said gas jet,
   said suppressor means including duct means for carrying said air through said wall means, through said nozzle, and into the gas jet exhausting from the nozzle,
   said duct means having upstream and downstream open ends,
   the improvement comprising:
   said duct means being open upstream to receive the ambient air and being connected into said wall means for carrying said air substantially in the axial direction through said nozzle and downstream thereof out of an open end of said duct means into the air ejecting gas jet;
   said duct means extending downstream of said nozzle at least to just beyond a region of high static pressure in said jet; and extending downstream of said nozzle to a position in the jet exhaust where a substantial ejected airflow pressure is maintained in said duct means;
   said wall means adjacent the downstream end of the nozzle include a plurality of annularly spaced lobes radially outwardly of the central portion;
   each lobe having duct means extending longitudinally therethrough; said duct means in each lobe being comprised on one duct spaced from the wall means forming the lobe, the space between said duct and wall means being for exhaust gas flow.

2. The invention according to claim 1 in which:
   each duct is substantially elliptical in cross section at its downstream end having its long diameter substantially in the direction of a diameter of the nozzle.

3. The invention according to claim 1 in which:
   said duct means are positioned asymmetrically with respect to the nozzle and central portion so as to be radially outwardly of the central portion.

4. The invention according to claim 3 in which:
   said duct means are separate ducts spaced annularly along a peripheral portion of the nozzle.

5. The invention according to claim 1 in which:
   said duct means includes a single hollow tube extending substantially coaxially with said central portion adjacent the downstream end of said nozzle.

6. The invention according to claim 1 in which:
   said duct means adjacent the downstream end of said nozzle includes an annulus formed between two tubes extending substantially coaxially with said central portion.

7. The invention according to claim 1 in which:
said upstream and downstream ends of said duct means are fixedly open.

8. The invention according to claim 1 in which:
said duct means includes a single hollow duct extending adjacent said central portion adjacent the downstream end of said nozzle;
said duct in cross section being in the form of two concentric semicircles closed at their ends.

9. In a jet engine nozzle adapted to exhaust a propulsive gas jet,
said nozzle having wall means longitudinally bounding a central portion within said nozzle,
a jet engine noise suppressor for supplying ambient air through the inside of said nozzle so as to reduce the noise produced by said gas jet,
said suppressor including duct means for carrying said air through said wall means, through said nozzle, and into the gas jet exhausting from the nozzle,
said duct means having upstream and downstream open ends,
the improvement comprising:
said duct means being open upstream to receive the ambient air and being connected into said wall means for carrying said air substantially in the axial direction through said nozzle and downstream thereof out of an open end of said duct means into the gas jet;
said duct means extending downstream of said nozzle at least to just beyond a region of high static pressure in said jet, and extend in the jet exhaust to where a substantial ejected airflow pressure and volume are maintained in the duct means;
said duct means being positioned asymmetrically with respect to the nozzle and central portion so as to be radially outwardly of the central portion, and adjacent a peripheral portion of the nozzle.

10. The invention according to claim 9 in which:
said ducts means are separate ducts arranged annularly in said peripheral portion.

11. The invention according to claim 9 in which:
said duct means are closed to said nozzle upstream of the downstream end of the nozzle.

12. In a jet engine nozzle adapted to exhaust a propulsive gas jet,
said nozzle having wall means longitudinally bounding a hollow central portion substantially coaxial with said nozzle,
jet engine noise suppressor means for supplying ambient air through the inside of said nozzle so as to reduce the noise produced by the said gas jet,
said suppressor means including duct means for carrying said air through said wall means, through said nozzle, and into the gas jet exhausting from the nozzle,
said duct means having upstream and downstream open ends,
the improvement comprising:
said duct means being open upstream to receive the ambient air and being connected into said wall means for carrying said air substantially in the axial direction through said nozzle and downstream thereof out of an open end of said duct means into the air ejecting gas jet;
said wall means adjacent the downstream end of the nozzle including a plurality of annularly spaced lobes radially outwardly of the central portion;
said duct means being positioned in selected lobes so as to be asymmetrically positioned with respect to the nozzle and the central portion;
said duct means in said selected lobes being comprised of one duct spaced from the wall means forming the lobe, the space between said duct and wall means being for exhaust gas flow.

13. The invention according to claim 12 in which:
each duct is substantially elliptical in cross section at its downstream end having its long diameter substantially in the direction of a diameter of the nozzle.

14. The invention according to claim 12 in which:
each duct is generally circular in cross section at its downstream end.

15. In a jet engine nozzle adapted to exhaust a propulsive gas jet,
said nozzle having wall means longitudinally bounding a hollow central portion substantially coaxial with said nozzle,
jet engine noise suppressor means for supplying ambient air through the inside of said nozzle so as to reduce the noise produced by said gas jet,
said suppressor means including duct means for carrying said air through said wall means, through said nozzle, and into the gas jet exhausting from the nozzle,
said duct means having upstream and downstream open ends,
the improvement comprising:
said duct means being open upstream to receive the ambient air and being connected into said wall means for carrying said air substantially in the axial direction through said nozzle and downstream thereof out of an open end of said duct means into the air ejecting gas jet;
the downstream end of said nozzle terminating in a plurality of annularly spaced gas exhaust tubes;
said duct means being positioned in selected tubes so as to be asymmetrically positioned with respect to the nozzle and the central portion;
said duct means in said selected tubes being comprised of one duct spaced from the wall of the tube, the space between said duct and tube wall being for exhaust gas flow.

* * * * *

UNITED STATES PATENT AND TRADEMARK OFFICE
CERTIFICATE OF CORRECTION

PATENT NO. : 4,474,259
DATED : October 2, 1984
INVENTOR(S) : Charles P. Wright

It is certified that error appears in the above-identified patent and that said Letters Patent are hereby corrected as shown below:

Column 6, line 53, "16" should be --166--.

Column 7, lines 41-46, that portion of the formula reading $$\sum_{90°}^{100°} \left[ \frac{10^{\frac{PNL}{10}}}{SiN^2 \theta} \right]$$ should read $$\sum_{90°}^{160°} \left[ \frac{10^{\frac{PNL}{10}}}{\sin^2 \theta} \right]$$

Column 8, line 46 (3rd to last line of claim 1), "on" should be --of--.

Signed and Sealed this

Fifteenth Day of October 1985

[SEAL]

Attest:

DONALD J. QUIGG

Attesting Officer

Commissioner of Patents and Trademarks—Designate